(12) United States Patent
Oga et al.

(10) Patent No.: US 12,323,224 B2
(45) Date of Patent: Jun. 3, 2025

(54) SATELLITE COMMUNICATION DEVICE, CORE NETWORK DEVICE, CONTROL CIRCUIT, STORAGE MEDIUM, AND QUALITY OF SERVICE CONTROL METHOD

(71) Applicant: Mitsubishi Electric Corporation, Tokyo (JP)

(72) Inventors: Masao Oga, Tokyo (JP); Keijiro Take, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 371 days.

(21) Appl. No.: 17/836,141

(22) Filed: Jun. 9, 2022

(65) Prior Publication Data
US 2022/0302998 A1 Sep. 22, 2022

Related U.S. Application Data

(63) Continuation of application No. PCT/JP2020/008510, filed on Feb. 28, 2020.

(51) Int. Cl.
*H04B 7/185* (2006.01)
*H04W 28/02* (2009.01)

(52) U.S. Cl.
CPC ..... *H04B 7/18519* (2013.01); *H04B 7/18513* (2013.01); *H04W 28/0268* (2013.01)

(58) Field of Classification Search
CPC ............... H04B 7/185; H04B 7/17508; H04B 7/1851; H04B 7/18513; H04B 7/18515;
(Continued)

(56) References Cited

U.S. PATENT DOCUMENTS

| 8,971,263 | B2 | 3/2015 | Johansson et al. |
| 10,021,600 | B2 | 7/2018 | Wolf et al. |
| 10,536,386 | B2 | 1/2020 | Maaref et al. |

(Continued)

FOREIGN PATENT DOCUMENTS

| JP | 2012-506201 A | 3/2012 |
| JP | 2016-508324 A | 3/2016 |
| JP | 2017-519425 A | 7/2017 |
| JP | 2017-518414 A | 8/2017 |

OTHER PUBLICATIONS

Extended European Search Report for European Application No. 20920906.3, dated Dec. 21, 2022.
(Continued)

*Primary Examiner* — Matthew W Genack
(74) *Attorney, Agent, or Firm* — Birch, Stewart, Kolasch & Birch, LLP

(57) ABSTRACT

A satellite communication ground station as a satellite communication device performs communication control of a satellite backhaul link in a mobile communication system in which a ground base station and a core network device are connected via the satellite backhaul link, the satellite communication ground station including: a storage unit that stores a conversion table used in converting quality of service indicators that have different forms in the mobile communication system and the satellite backhaul link; and a quality of service indicator updating unit that updates priority of the quality of service indicator including priority of wireless communication of the satellite backhaul link in the conversion table on the basis of a result of evaluation of quality of service for each quality of service indicator.

19 Claims, 13 Drawing Sheets

(58) Field of Classification Search
CPC ............ H04B 7/18517; H04B 7/18519; H04B 7/18528; H04B 7/1853; H04W 28/00; H04W 28/02; H04W 28/0268; H04W 84/00; H04W 84/005; H04W 84/02; H04W 84/04; H04W 84/06
See application file for complete search history.

(56) References Cited

U.S. PATENT DOCUMENTS

| | | | |
|---|---|---|---|
| 10,548,071 | B2 | 1/2020 | Maaref et al. |
| 10,813,043 | B2 | 10/2020 | Maaref et al. |
| 2013/0084873 | A1* | 4/2013 | Sharony ............ H04W 36/1446 455/438 |
| 2013/0343252 | A1* | 12/2013 | Chakraborty ..... H04W 52/0261 370/311 |
| 2015/0118954 | A1* | 4/2015 | Sundstedt ............... H04W 4/70 455/9 |
| 2019/0089636 | A1* | 3/2019 | Yamasaki ............. H04L 47/805 |
| 2021/0119724 | A1* | 4/2021 | Gapin .................. H04L 1/0017 |

OTHER PUBLICATIONS

Völk et al., "Concept and Evaluation of Mobile Cell Connectivity Over a Satellite Backhaul for Future 5G Networks" IEEE GobalSIP, 2018, pp. 1025-1029.
"3rd Generation Partnership Project; Technical Specification Group Radio Access Network; Solutions for NR to support non-terrestrial networks (NTN) (Release 16)", 3GPP TR 38.821 V1.0.0, Dec. 2019, Technical Report, total 143 pages.
"3rd Generation Partnership Project; Technical Specification Group Services and System Aspects; Study on architecture aspects for using satellite access in 5G (Release 17)", 3GPP TR 23. 737 V17.0.0, Dec. 2019, Technical Report, total 82 pages.
International Search Report, issued in PCT/JP2020/008510, dated May 26, 2020.
Written Opinion of the International Searching Authority, issued in PCT/JP2020/008510, dated May 26, 2020.
European Communication pursuant to Article 94(3) EPC for European Application No. 20 920 906.3, dated Sep. 6, 2024.

* cited by examiner

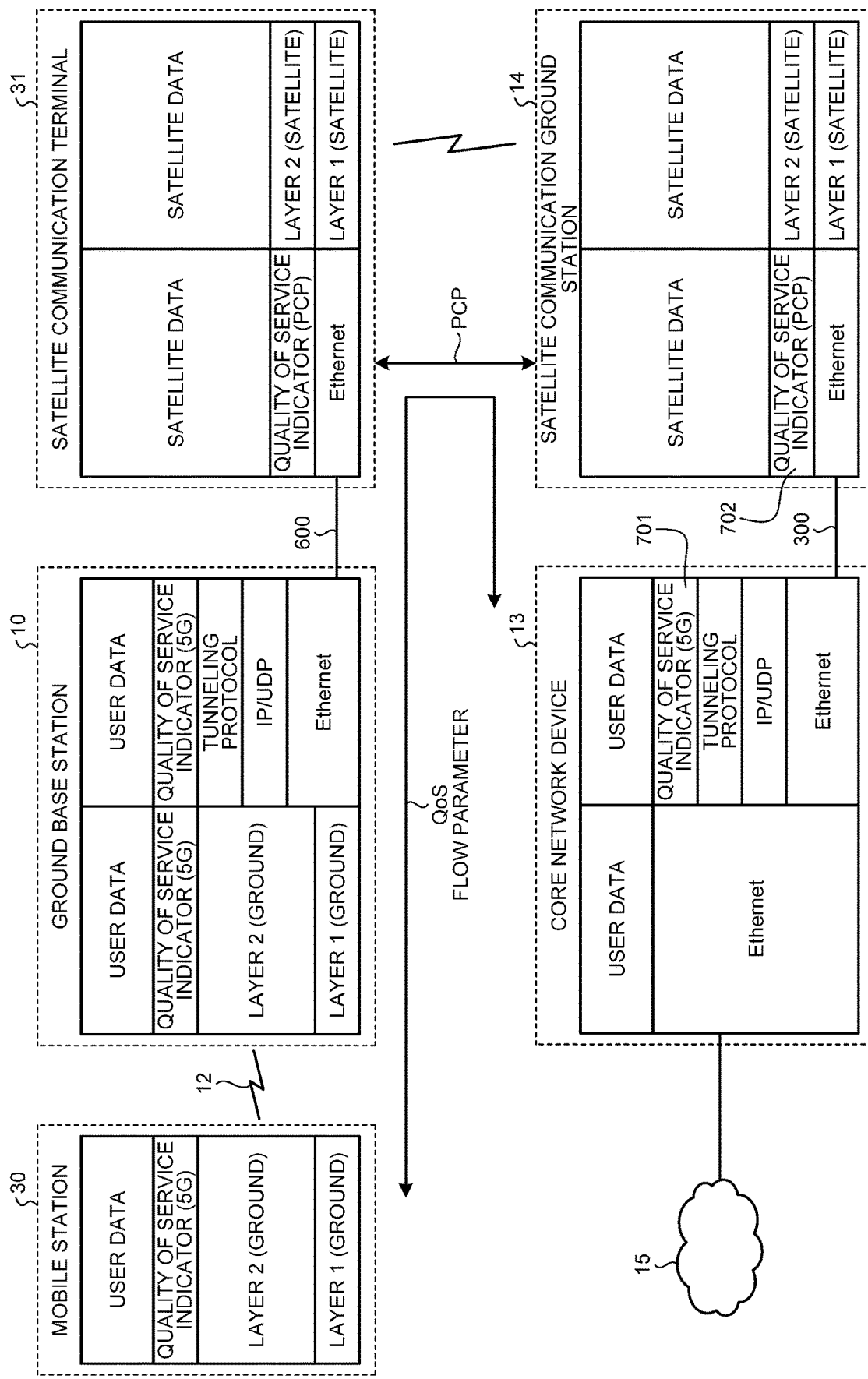

FIG.5

Table 800 - QoS flow parameters:

| QoS flow type | QoS flow parameters | |
|---|---|---|
| Guaranteed Bit Rate (GBR) flow / Non-GBR flow | 5QI | Resource Type |
| | | Default Priority Level |
| | | Packet Delay Budget (PDB) |
| | | Packet Error Loss Rate (PER) |
| | | Default Maximum Data Burst Volume |
| | | Default Averaging Window |
| | Allocation and Retention Priority (ARP) | |
| | Reflective QoS Attribute (RQA) | |
| | Guaranteed Flow Bit Rate (GFBR) | |
| | Maximum Flow Bit Rate (MFBR) | |
| | Notification Control | |
| | Maximum Packet Loss Rate | |

ASSOCIATED

Table 801:

| PRIORITY CLASS | SETTING VALUE |
|---|---|
| FIRST PRIORITY | 111 |
| | 110 |
| | 101 |
| SECOND PRIORITY | 100 |
| | 011 |
| THIRD PRIORITY | 010 |
| | 001 |
| UNPRIORITIZED | 000 |
| | NO VLAN TAG |

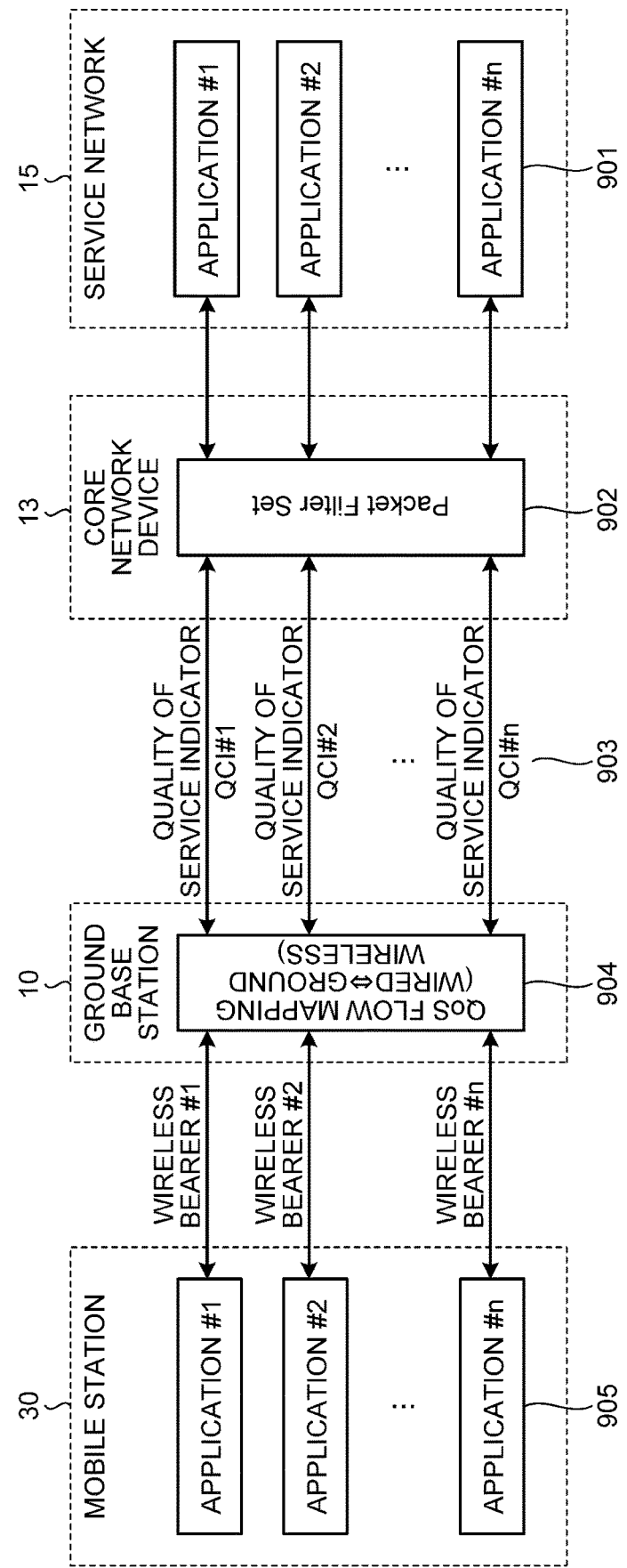

FIG.7

| Packet Filter Set | | QoS FILTER INFORMATION | | REMARKS |
|---|---|---|---|---|
| 1 | IP Packet Filter Set | 1 | IP ADDRESS | Source IP address, Destination IP address |
| | | 2 | IPv6 prefix | |
| | | 3 | PORT NUMBER | Source port number, Destination port number |
| | | 4 | PROTOCOL IDENTIFIER | |
| | | 5 | TYPE OF SERVICE | Type of Service (ToS), Traffic Class (IPv6) |
| | | 6 | Security Parameter Index | |
| | | 7 | Packet Filter Direction | |
| 2 | Ethernet Packet Filter Set | 1 | MAC ADDRESS | Source MAC address, Destination MAC address |
| | | 2 | Ethernet Type | SEE IP Packet Filter Set WHEN Ethernet Type = IPv4/IPv6 |
| | | 3 | VLAN tag (1) | Customer VLAN tag, Service VLAN tag VID field |
| | | 4 | VLAN tag (2) | Customer VLAN tag, Service VLAN tag PCP/DEI field |
| | | 5 | Packet Filter Direction | |

| QUALITY OF SERVICE INDICATOR (5G) | QUALITY OF SERVICE INDICATOR (PCP) | TRAFFIC [Mbps] | DWELL [ms] | COMMUNICATION BAND [Mbps] |
|---|---|---|---|---|
| QCI#A | PRIORITY 1 | 10 | 100 | Max. 300 Mbps |
| QCI#B | PRIORITY 2 | 9 | 100 | |
| QCI#C | PRIORITY 2 | 0 | 0 | |
| QCI#D | PRIORITY 3 | 20 | 150 | |
| QCI#E | PRIORITY 4 | 100 | 200 | |
| ⋮ | ⋮ | ⋮ | ⋮ | |
| QCI#Z | PRIORITY 7 | 35 | 1000 | |

FIG.10

| QUALITY OF SERVICE INDICATOR (5G) | QUALITY OF SERVICE INDICATOR (PCP) | TRAFFIC [Mbps] | DWELL [ms] | COMMUNICATION BAND [Mbps] |
|---|---|---|---|---|
| QCI#A | PRIORITY 1 | 10 | 100 | Max. 50 Mbps |
| QCI#B | PRIORITY 2 | 5 | 100 | |
| QCI#C | PRIORITY 2 | 10 | 150 | |
| QCI#D | PRIORITY 3 | 3 | 200 | |
| QCI#E | PRIORITY 4 | 1 | 250 | |
| ⋮ | ⋮ | ⋮ | ⋮ | |
| QCI#Z | PRIORITY 7 | 10 | 20000 | |

FIG.11

| QUALITY OF SERVICE INDICATOR (5G) | QUALITY OF SERVICE INDICATOR (PCP) | TRAFFIC [Mbps] | DWELL [ms] | COMMUNICATION BAND [Mbps] |
|---|---|---|---|---|
| QCI#A | PRIORITY 1 | 10 | 150 | Max. 50 Mbps |
| QCI#B | PRIORITY 1 | 5 | 150 | |
| QCI#C | PRIORITY 1 | 10 | 150 | |
| QCI#D | PRIORITY 2 | 3 | 250 | |
| QCI#E | PRIORITY 2 | 1 | 250 | |
| ⋮ | ⋮ | ⋮ | ⋮ | |
| QCI#Z | PRIORITY 3 | 10 | 1000 | |

SATELLITE COMMUNICATION DEVICE, CORE NETWORK DEVICE, CONTROL CIRCUIT, STORAGE MEDIUM, AND QUALITY OF SERVICE CONTROL METHOD

CROSS-REFERENCE TO RELATED APPLICATION

This application is a continuation application of International Application PCT/JP2020/008510, filed on Feb. 28, 2020, and designating the U.S., the entire contents of which are incorporated herein by reference.

BACKGROUND OF THE INVENTION

1. Field of the Invention

The present disclosure relates to a satellite communication device, a core network device, a control circuit, a storage medium, and a quality of service control method in a mobile communication system using a satellite backhaul link.

2. Description of the Related Art

A fifth generation mobile communication (hereinafter referred to as 5G) system is expected to be used in business fields such as industrial applications in addition to a mobile broadband service which is a conventional mobile phone service, and as one expected use of the 5G system, application to satellite communication that can provide a wide coverage area has attracted attention. Moreover, in the provision of 5G services to areas other than urban areas where the density of people is low such as on the sea and in mountainous areas, the 5G system that utilizes satellite communication for a backhaul link connecting a ground base station and a core network device has been considered in order to reduce the cost of laying the ground base station such as laying optical fibers.

Such a system uses a conversion method in which quality of service (QoS), that is, a quality of service indicator of the 5G system is associated with a quality of service indicator of the satellite communication. However, the quality of service indicator of 5G includes a combination of various communication qualities. Furthermore, in a case where there is a large number of ground base stations using a satellite backhaul link in a beam emitted from a satellite to the Earth's surface, the communication links of the ground base stations have larger capacity than the satellite communication link. Therefore, a simple method of converting the quality of service indicator has had a problem in that priorities of the quality of service among the ground base stations affect one another to cause data with low priority to dwell, or stagnate.

As a method for solving such a problem, Japanese Translation of PCT International Application Laid-open No. 2017-516414 discloses a technique of managing radio resources as a unified air interface in which a wireless backhaul link between base stations that perform wireless communication with a mobile device includes two different bands, and changing the communication speed of each band using cumulative communication speed, minimum communication speed, or the like as an evaluation index for the quality of service.

Although the above conventional technique changes the communication speed by adjusting the radio resources so as to satisfy the quality of service of the wireless backhaul link, there has been a problem in that the entire network needs to have a unified quality of service indicator. In addition, according to the above conventional technique, the quality of service is maintained by radio resource allocation, and thus there has been a problem in that adjustment for ensuring the quality of service cannot be performed for each base station on the satellite backhaul link that covers a wide area like satellite communication and accommodates a large number of base stations at the same time.

The present disclosure has been made in view of the above, and an object thereof is to provide a satellite communication device that can convert quality of service indicators of different communication sections while preventing or reducing an influence of the quality of service indicators between base stations in a mobile communication system using a satellite backhaul link.

SUMMARY OF THE INVENTION

In order to solve the above problem and achieve the object, the present disclosure is a satellite communication device that performs communication control of a satellite backhaul link in a mobile communication system in which a ground base station and a core network device are connected via the satellite backhaul link. The satellite communication device includes: a storage unit to store a conversion table used in converting a quality of service indicator that has a different form in each of the mobile communication system and the satellite backhaul link; and a quality of service indicator updating unit to update priority of the quality of service indicator including priority of wireless communication of the satellite backhaul link in the conversion table on the basis of a result of evaluation of quality of service for each quality of service indicator.

BRIEF DESCRIPTION OF THE DRAWINGS

FIG. 4 is a diagram illustrating transmission paths of quality of service indicators between the core network device and a mobile station according to the present embodiment;

FIG. 5 is a set of tables illustrating an example of QoS flow parameters making up the quality of service indicator and priority class parameters making up the quality of service indicator according to the present embodiment;

FIG. 6 is a diagram illustrating a procedure of processing the quality of service indicators between the core network device and the ground base station according to the present embodiment;

FIG. 7 is a table illustrating an example of a packet filter set for identifying the quality of service indicator according to the present embodiment;

FIG. 9 is a table illustrating an example of a conversion table and a service state at normal time according to the present embodiment;

FIG. 10 is a table illustrating an example of a conversion table and a service state at the time of congestion of the satellite backhaul link according to the present embodiment;

FIG. 11 is a table illustrating an example of a conversion table updated and a service state at the time of congestion of the satellite backhaul link according to the present embodiment;

DETAILED DESCRIPTION OF THE PREFERRED EMBODIMENTS

Hereinafter, a satellite communication device, a core network device, a control circuit, a storage medium, and a quality of service control method according to an embodiment of the present disclosure will be described in detail with reference to the drawings. Note that the present disclosure is not limited to the embodiment. Note that the following description will be made on the premise that a mobile communication system is a fifth generation mobile communication system defined by the 3rd Generation Partnership Project (3GPP) or the like, but the present disclosure is not limited thereto.

Embodiment

The present embodiment will describe a method in which a satellite communication ground station as a satellite communication device monitors an amount of traffic for each quality of service indicator transmitted on a satellite backhaul link, and updates a conversion table for performing a conversion between the quality of service indicator of a mobile communication system utilizing the satellite backhaul link and the quality of service indicator of a different wireless communication system forming the satellite backhaul link.

Figure 1:
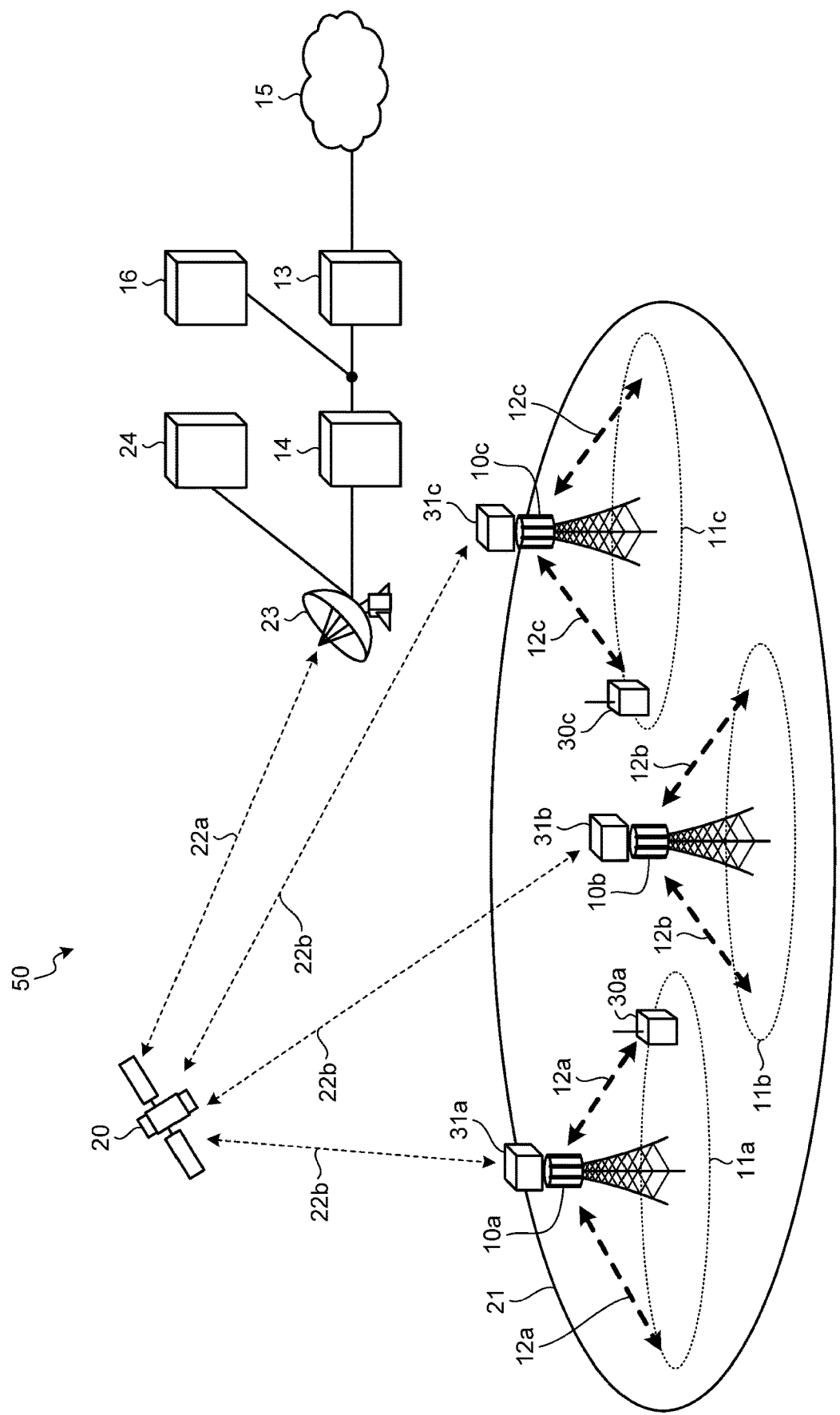
FIG. 1 is a diagram illustrating an example of a configuration of a mobile communication system formed by a satellite backhaul link according to the present embodiment.

FIG. 1 is a diagram illustrating an example of a configuration of a mobile communication system 50 formed by a satellite backhaul link according to the present embodiment. In the mobile communication system 50, a coverage area 11a under the control of a ground base station 10a is constructed by a ground wireless signal 12a transmitted from the ground base station 10a. Moreover, a coverage area 11b under the control of a ground base station 10b is constructed by a ground wireless signal 12b transmitted from the ground base station 10b. Furthermore, a coverage area 11c under the control of a ground base station 10c is constructed by a ground wireless signal 12c transmitted from the ground base station 10c. The ground base station 10a is connected to a mobile station 30a by the ground wireless signal 12a. The ground base station 10c is connected to a mobile station 30c by the ground wireless signal 12c. The ground base station 10b is connected to a mobile station moving into the coverage area 11b by the ground wireless signal 12b.

The present embodiment assumes that, in the mobile communication system 50, the ground wireless signals 12a, 12b, and 12c and a satellite wireless signal 22b of the satellite backhaul link use different frequency bands, but may adopt an operation mode in which the signals share the same frequency band. In the following description, the ground base stations 10a, 10b, and 10c may be referred to as a ground base station 10 when not distinguished from one another. Also, the coverage areas 11a, 11b, and 11c may be referred to as a coverage area 11 when not distinguished from one another. Moreover, the ground wireless signals 12a, 12b, and 12c may be referred to as a ground wireless signal 12 when not distinguished from one another. Furthermore, the mobile stations 30a and 30c may be referred to as a mobile station 30 when not distinguished from each other. The mobile communication system 50 is a system that connects the ground base station 10 and a core network device 13 via the satellite backhaul link.

The core network device 13 performs call control and authentication between the ground base station 10 and the mobile station 30. The core network device 13 also relays traffic of applications having various qualities of service between the mobile station 30 and a service network 15. In addition, the core network device 13 attaches a quality of service indicator of a 5G system to each piece of data by using QoS filter information such as an Internet protocol (IP) address or a differentiated services code point (DSCP) of the data received from the service network 15. As a result, in the mobile communication system 50, the ground base station 10 that has received the data can control the quality of service on the ground wireless signal 12 on the basis of the quality of service indicator attached to each data.

A satellite communication ground station 14 performs communication control of the satellite backhaul link using a satellite communication scheme such as digital video broadcasting (DVB)-S2X. The satellite communication ground station 14 is connected to a satellite communication antenna 23, and constructs a coverage area 21 by a satellite wireless signal 22a forming a feeder link via a satellite 20 and the satellite wireless signals 22b forming service links with satellite communication terminals 31a, 31b, and 31c connected to corresponding ones of the ground base stations 10a, 10b, and 10c by a satellite beam. As a result, the satellite communication ground station 14 establishes the satellite backhaul link between the ground base station 10 and the core network device 13. In the following description, the satellite communication terminals 31a, 31b, and 31c may be referred to as a satellite communication terminal 31 when not distinguished from one another.

A network control station 24 controls communication resources of the satellite 20 for each beam. The network control station 24 provides beam hopping that controls communication speed for each beam by monitoring the amount of traffic for each beam and changing an amount of use of the communication resources, transmission time, and the like of the satellite wireless signals 22a and 22b transmitted by the satellite 20. A management device 16 sets the quality of service indicators and the like for the core network device 13 and the satellite communication ground station 14.

Note that, in the mobile communication system 50, communication among the ground base station 10, the satellite communication terminal 31, the satellite communication ground station 14, the core network device 13, the service network 15, the management device 16, and the network control station 24 is established by, for example, a connection method such as an IP network or an Ethernet (registered trademark) network, but the present disclosure is not limited thereto. The present embodiment will be described on the premise of communication via the IP network.

Figure 2:
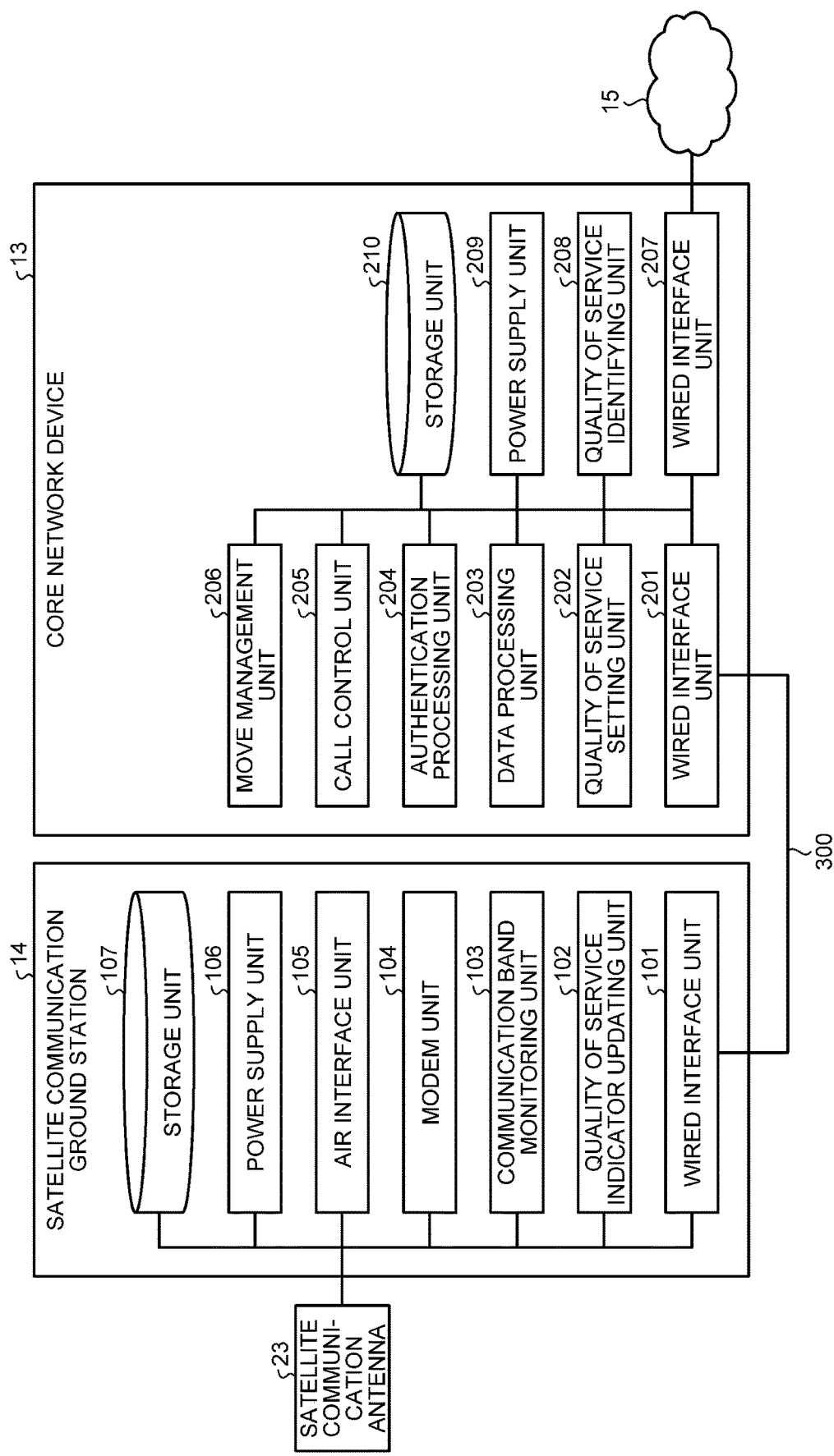
FIG. 2 is a block diagram illustrating an example of configurations of a core network device and a satellite communication ground station according to the present embodiment.

FIG. 2 is a block diagram illustrating an example of configurations of the core network device 13 and the satellite communication ground station 14 according to the present embodiment.

The core network device 13 includes a wired interface unit 201, a quality of service setting unit 202, a data processing unit 203, an authentication processing unit 204, a call control unit 205, a move management unit 206, a wired interface unit 207, a quality of service identifying unit 208, a power supply unit 209, and a storage unit 210.

The wired interface unit 201 is a first wired interface connected to the satellite communication ground station 14 and the management device 16 via a wired line 300. The wired interface unit 207 is a second wired interface connected to the external service network 15 by wire.

The call control unit 205 performs control for communication connection with the mobile station 30 located in the coverage area 11 of the ground base station 10 via the satellite backhaul link. The authentication processing unit 204 is a functional unit that determines whether or not a service can be provided to the mobile station 30 in the mobile communication system 50 in communication connection processing by the call control unit 205. The authentication processing unit 204 has a function of rejecting a connection request when the mobile station 30 that is unauthorized makes the connection request. The move management unit 206 manages the coverage area 11 and the coverage area 21 in which the mobile station 30 is located after the communication connection therewith is completed in the mobile communication system 50.

The quality of service identifying unit 208 identifies quality of service required for data received from the service network 15 on the basis of Ethernet header information, IP header information, or the like of the data. The quality of service setting unit 202 attaches quality of service information identified by the quality of service identifying unit 208 to the data. The data processing unit 203 transfers the data to which the quality of service information is attached by the quality of service setting unit 202 to the satellite communication ground station 14.

The power supply unit 209 supplies power to each component in the core network device 13. The storage unit 210 stores internal information necessary for the operation of the core network device 13, and holds identification information of the quality of service, information on the mobile station 30, and the like.

The satellite communication ground station 14 includes a wired interface unit 101, a quality of service indicator updating unit 102, a communication band monitoring unit 103, a modem unit 104, an air interface unit 105, a power supply unit 106, and a storage unit 107.

The wired interface unit 101 is connected to the core network device 13 by wire. The air interface unit 105 performs transmission/reception processing of the satellite wireless signal 22a via the satellite communication antenna 23. The modem unit 104 performs control for wireless connection in satellite communication. The power supply unit 106 supplies power to each component of the satellite communication ground station 14. The storage unit 107 accumulates internal information necessary for the operation of the satellite communication ground station 14. The storage unit 107 stores a conversion table used in converting quality of service indicators that have different forms in the mobile communication system 50 and the satellite backhaul link. The quality of service indicator updating unit 102 provides a function of converting a quality of service indicator set by the quality of service setting unit 202 of the core network device 13 into a quality of service indicator having a different form used on the satellite backhaul link. Specifically, the quality of service indicator updating unit 102 updates the priority of the quality of service indicator including the priority of the wireless communication of the satellite backhaul link in the conversion table on the basis of a result of evaluation of the quality of service for each quality of service indicator. The communication band monitoring unit 103 acquires, from the network control station 24, communication band information for each beam transmitted from the satellite 20 and manages the information. The quality of service indicator updating unit 102 stores the quality of service indicator of the core network device 13 set by the management device 16 in the storage unit 107 in order to recognize the quality of service indicator used by the core network device 13.

In the present embodiment, the quality of service indicator applied to the satellite backhaul link between the satellite communication ground station 14 and the satellite communication terminal 31 is a priority code point (PCP) defined by Institute of Electrical and Electronics Engineers (IEEE) 802.1p. In addition, the quality of service indicator applied between the mobile station 30 under the control of the ground base station 10 and the core network device 13 is a QoS flow parameter including a 5G QoS indicator (5QI) defined in the fifth generation mobile communication system. Note that these quality of service indicators are examples, and any configuration having different quality of service indicators can be applied to the present embodiment. Furthermore, in the present embodiment, the satellite communication ground station 14 and the core network device 13 are configured as individual devices, but may be integrated.

Figure 3:
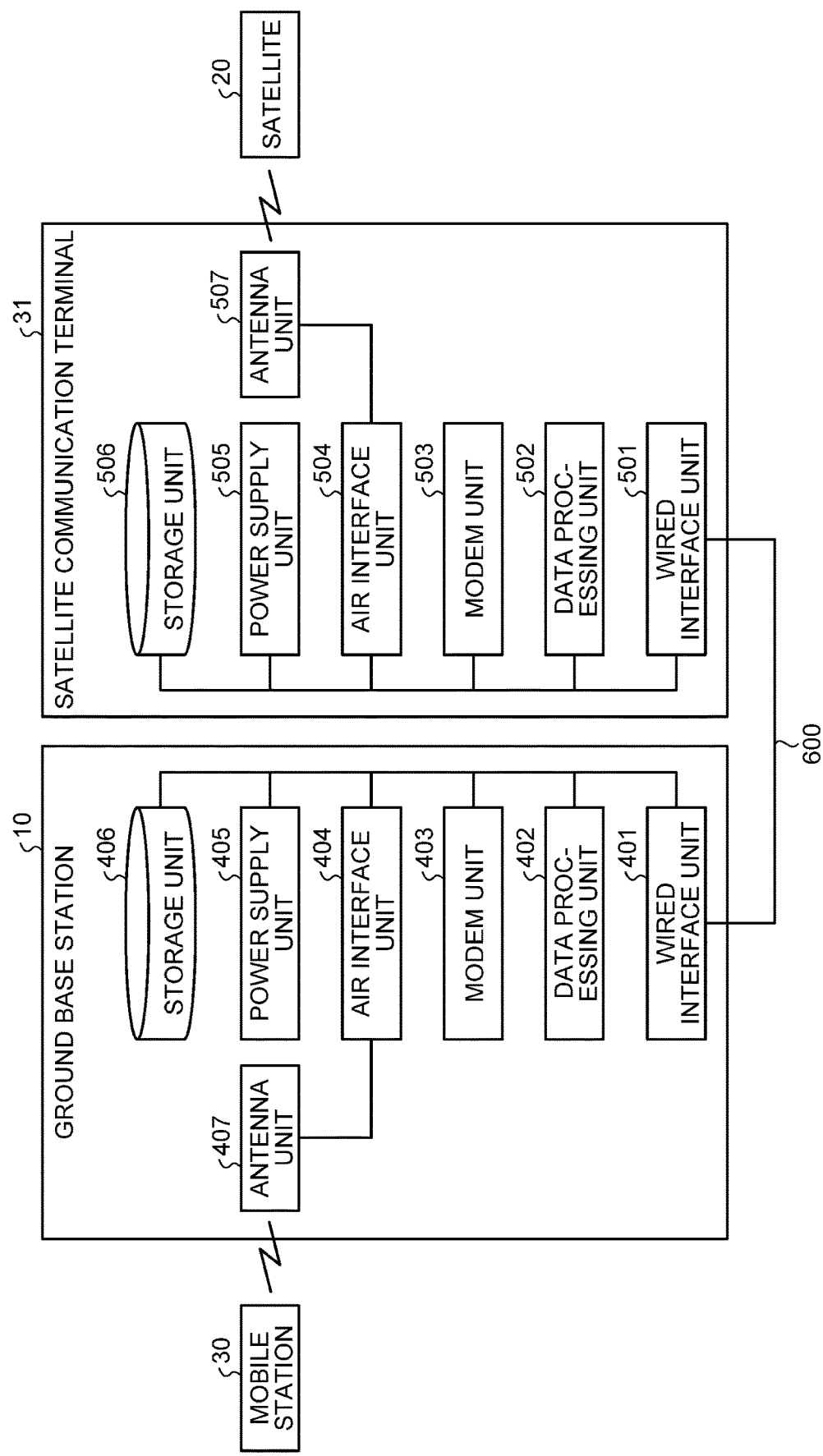
FIG. 3 is a block diagram illustrating an example of configurations of a ground base station and a satellite communication terminal according to the present embodiment.

FIG. 3 is a block diagram illustrating an example of configurations of the ground base station 10 and the satellite communication terminal 31 according to the present embodiment.

The ground base station 10 includes a wired interface unit 401, a data processing unit 402, a modem unit 403, an air interface unit 404, a power supply unit 405, a storage unit 406, and an antenna unit 407. The wired interface unit 401 is connected to the satellite communication terminal 31 via a wired line 600. The antenna unit 407 transmits and receives the ground wireless signal 12 to and from the mobile station 30. The air interface unit 404 performs transmission/reception processing of the ground wireless signal 12. The modem unit 403 performs control for wireless connection. The data processing unit 402 performs data processing based on a quality of service indicator of the core network device 13. The power supply unit 405 supplies power to each component of the ground base station 10. The storage unit 406 accumulates internal information necessary for the operation of the ground base station 10.

The satellite communication terminal 31 includes a wired interface unit 501, a data processing unit 502, a modem unit 503, an air interface unit 504, a power supply unit 505, a storage unit 506, and an antenna unit 507. The wired interface unit 501 is connected to the ground base station 10 via the wired line 600. The antenna unit 507 transmits and receives the satellite wireless signal 22b on a service link to and from the satellite 20. The air interface unit 504 performs transmission/reception processing of the satellite wireless signal 22b. The modem unit 503 performs control for wireless connection in satellite communication. The data processing unit 502 performs data processing based on a quality of service indicator of the satellite backhaul link. The power supply unit 505 supplies power to each component of the satellite communication terminal 31. The storage unit 506 accumulates internal information necessary for the operation of the satellite communication terminal 31. In the satellite communication terminal 31, the power supply unit 505 may include a battery for use as an emergency power supply at the time of disaster or the like. Also, the satellite communication terminal 31 may be supplied with power by another method such as receiving power supply from the power supply unit 405 of the ground base station 10 at normal times.

FIG. 4 is a diagram illustrating transmission paths of quality of service indicators between the core network device 13 and the mobile station 30 according to the present embodiment.

The core network device 13 encapsulates data of an application received from the service network 15 using a tunneling protocol such as general packet radio service tunneling protocol (GTP), and then transfers the data to the satellite communication ground station 14. In the core network device 13, the quality of service identifying unit 208 recognizes characteristics of the application such as real-time performance and reliability of the data in the encapsulating processing. On the basis of the characteristics of the application recognized by the quality of service identifying unit 208, the quality of service setting unit 202 attaches a quality of service indicator 701 illustrated in FIG. 5 to be described later.

In the satellite communication ground station 14, upon receiving the data from the core network device 13, the quality of service indicator updating unit 102 uses a conversion table stored in the storage unit 107 to perform a conversion between the quality of service indicator 701 attached to the data and a quality of service indicator 702 illustrated in FIG. 5 to be described later. The satellite communication ground station 14 transmits the data after the quality of service indicator has been converted to the satellite communication terminal 31 via the satellite backhaul link.

FIG. 5 is a set of tables illustrating an example of QoS flow parameters 800 making up the quality of service indicator 701 and priority class parameters 801 making up the quality of service indicator 702 according to the present embodiment. All or only some of the QoS flow parameters 800 and the priority class parameters 801 may be set and used. The QoS flow parameters 800 are different from the priority class parameters 801 and include a combination of various indicators such as reliability, delay, and error rate in addition to priority. In the present embodiment, the mobile communication system 50 performs priority control on the satellite backhaul link on the basis of the quality of service indicator 702, and sequentially transmits data in descending order of priority. Note that when transmitting the quality of service indicator 701 on the satellite backhaul link, the mobile communication system 50 transmits the quality of service indicator 701 as satellite data. The mobile communication system 50 may set the frequency of transmission in accordance with the priority in the priority control on the satellite backhaul link.

The satellite communication terminal 31 transfers the data received from the satellite communication ground station 14 via the satellite backhaul link to the ground base station 10 via the wired line 600. The data processing unit 402 of the ground base station 10 maps the data received from the satellite communication terminal 31 to a wireless bearer corresponding to the quality of service indicator 701, and transmits the data to the mobile station 30 by the ground wireless signal 12.

FIG. 6 is a diagram illustrating a procedure of processing the quality of service indicators between the core network device 13 and the ground base station 10 according to the present embodiment.

When an application 901 used in the service network 15 and the core network device 13 perform communication, the quality of service identifying unit 208 of the core network device 13 compares a parameter set in a packet filter set 902 illustrated in FIG. 7 with received data of the application 901, and determines a corresponding quality of service indicator 903. FIG. 7 is a table illustrating an example of the packet filter set 902 for identifying the quality of service indicator according to the present embodiment. The quality of service identifying unit 208 uses an IP packet filter set when the data of the application 901 uses IP data. The quality of service identifying unit 208 uses an Ethernet packet filter set when the data of the application 901 uses an Ethernet application. Note that the packet filter set illustrated in FIG. 7 is an example, and a unique protocol or the like may be newly defined. In the core network device 13, the quality of service setting unit 202 attaches the quality of service indicator 903 determined by the quality of service identifying unit 208 to the data, thereby transmitting the data via the satellite backhaul link.

The ground base station 10 receives the data via the satellite backhaul link. The data processing unit 402 of the ground base station 10 maps the data to a wireless bearer corresponding to the quality of service indicator 903 set by the quality of service setting unit 202 of the core network device 13 in accordance with specified QoS flow mapping 904, and transmits the data to the mobile station 30. The mobile station 30 processes the data received from the ground base station 10 by an application 905. Note that in the present embodiment, a plurality of the applications are used in the mobile station 30, but the present disclosure is not limited thereto. In the mobile communication system 50, a plurality of the mobile stations 30 may use different applications.

Figure 8:
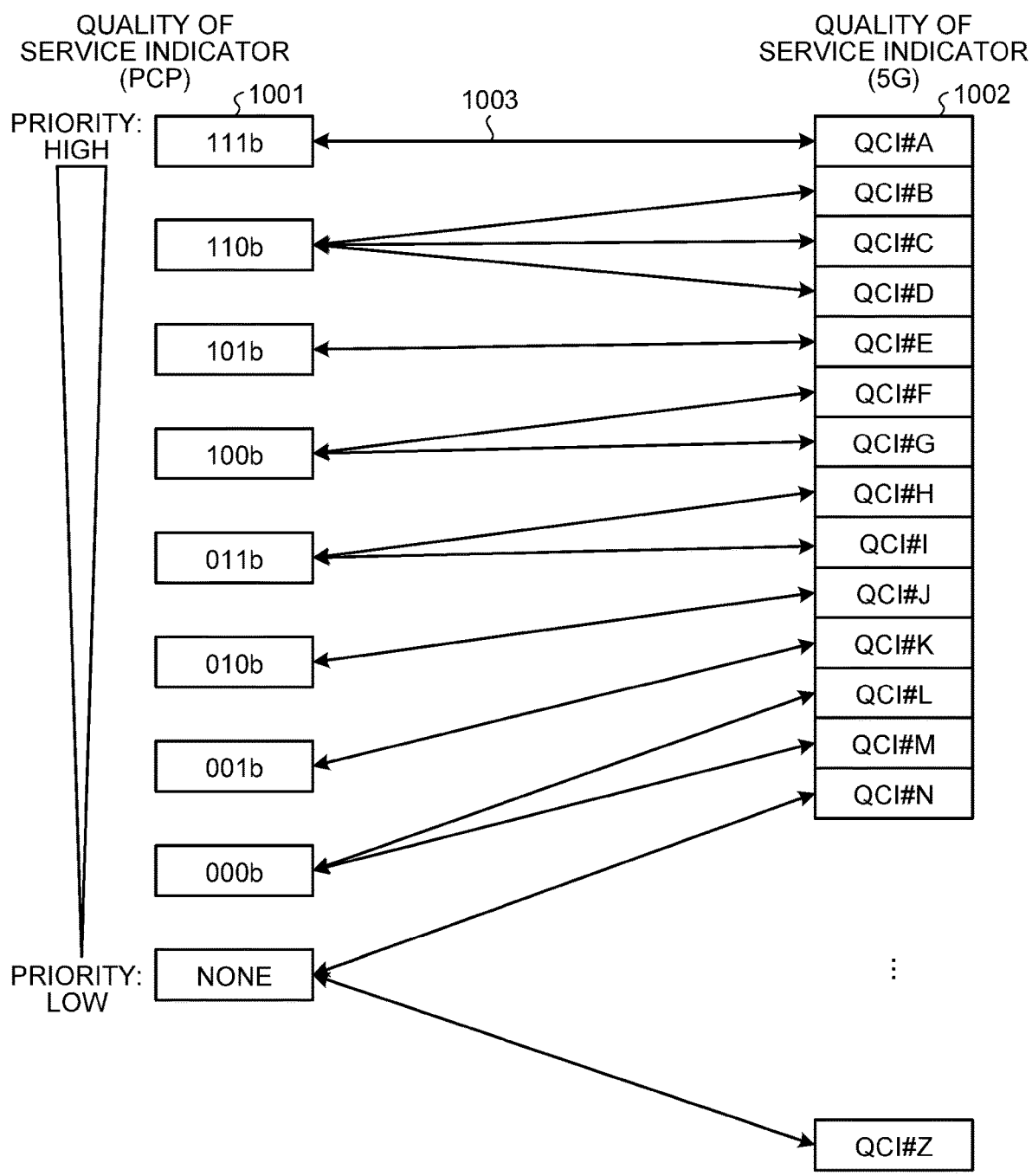
FIG. 8 is a diagram illustrating an example of a conversion table for converting the quality of service indicators between the QoS flow parameters and the priority class parameters that are the different quality of service indicators according to the present embodiment.

FIG. 8 is a diagram illustrating an example of a conversion table for converting the quality of service indicators between the QoS flow parameters and the priority class parameters that are the different quality of service indicators according to the present embodiment. Quality of service indicators 1001 have priority determined in accordance with their respective setting values. On the other hand, quality of service indicators 1002 include a combination of various indicators such as reliability, delay, and error rate in addition to priority. A conversion table 1003 indicates the correspondence between the quality of service indicators 1001 and the quality of service indicators 1002. Note that since the definition of each quality of service indicator is different, the conversion table 1003 does not necessarily have a one-to-one correspondence.

Next, a method of updating the quality of service indicators in the present embodiment will be described. FIG. 9 is a table illustrating an example of a conversion table 1010 and a service state at normal time according to the present embodiment. The communication band monitoring unit 103 of the satellite communication ground station 14 manages amounts of traffic and dwell for each quality of service indicator, and a communication band for each beam acquired from the network control station 24. The quality of service indicator updating unit 102 of the satellite communication ground station 14 evaluates the amount of dwell as communication quality and monitors whether or not the quality is acceptable for all the quality of service indicators. Here, as an example, the quality of service indicator updating unit 102 sets a threshold for each field represented by each column of the quality of service indicators (5G) or the quality of service indicators (PCP) illustrated in FIG. 9, and detects congestion when the threshold is exceeded. The threshold may take a different value for each field, or may take the same value in different fields.

FIG. 10 is a table illustrating an example of a conversion table 1020 and a service state at the time of congestion of the satellite backhaul link according to the present embodiment. The network control station 24 monitors a traffic condition on the satellite backhaul link, and when traffic concentration occurs in a specific beam, performs control to preferentially allocate the communication band to that beam. The example of FIG. 10 indicates that the communication band of a specific beam has decreased from 300 Mbps to 50 Mbps among the communication bands of the beams managed by the communication band monitoring unit 103 of the satellite communication ground station 14. The network control station 24 may perform the communication band control by adjusting the communication bandwidth or adjusting the allocation frequency of beam hopping. Note that the communication band control by the network control station 24 is not performed in accordance with the quality of service indicators, but is determined on the basis of a method of optimizing the satellite communication link.

When acquiring the communication band that has been changed from the network control station 24, the communication band monitoring unit 103 of the satellite communication ground station 14 updates the communication band being managed. When the traffic increases, the amount of dwell for priority "7" increases, and thus the quality of service indicator updating unit 102 detects that the threshold of the quality of service indicator for a quality of service indicator QCI #Z is exceeded. After detecting the decrease in the quality of service, the quality of service indicator updating unit 102 updates the conversion table so as to increase the priority of the quality of service indicator (PCP) corresponding to the quality of service indicator QCI #Z. The quality of service indicator updating unit 102 continues the evaluation of the amount of dwell and updates the conversion table such that the amount of dwell becomes less than or equal to the threshold of the quality of service indicator. That is, in a case where a result of evaluation indicates the decrease in the quality of service, the quality of service indicator updating unit 102 updates the conversion table so as to increase the priority of the corresponding quality of service indicator. Note that as the method of updating the conversion table, the quality of service indicator updating unit 102 may perform the update only on the QCI for which the quality of service has been decreased, or may lower the priority associated with the QCI having higher priority.

FIG. 11 is a table illustrating an example of a conversion table 1030 updated and a service state at the time of congestion of the satellite backhaul link according to the present embodiment. In the example of FIG. 11, the quality of service indicator updating unit 102 performs an update such that the priority is increased for the QCI whose quality of service has not been decreased, changing the number of levels of the priority from seven levels to three levels. The quality of service indicator updating unit 102 may thus update the conversion table so as to relatively decrease the number of levels of the priority. Note that in the satellite communication ground station 14, for data corresponding to the QCI whose quality of service has been decreased, the modem unit 104 may duplicate the data to be transmitted to the ground base station 10 and transmit the data. As a result, the mobile communication system 50 can improve the reliability of communication using the satellite backhaul link.

As described above, the quality of service indicator updating unit 102 of the satellite communication ground station 14 performs the update processing on the conversion table as illustrated in FIGS. 9 to 11, whereby the mobile communication system 50 using the satellite backhaul link can convert the quality of service indicators of different communication sections while preventing or reducing an influence of the quality of service indicators between the base stations. Note that in the present embodiment, the quality of service indicator updating unit 102 of the satellite communication ground station 14 uses the amount of dwell in evaluating the quality of service indicators, but the present disclosure is not limited thereto. Moreover, in a case where it is confirmed that the quality of service has been improved for the quality of service indicator QCI whose priority has been updated, the quality of service indicator updating unit 102 of the satellite communication ground station 14 may perform an update to restore, that is, lower the priority of the quality of service indicator (PCP) corresponding to the quality of service indicator QCI whose priority has been increased.

Figure 12:
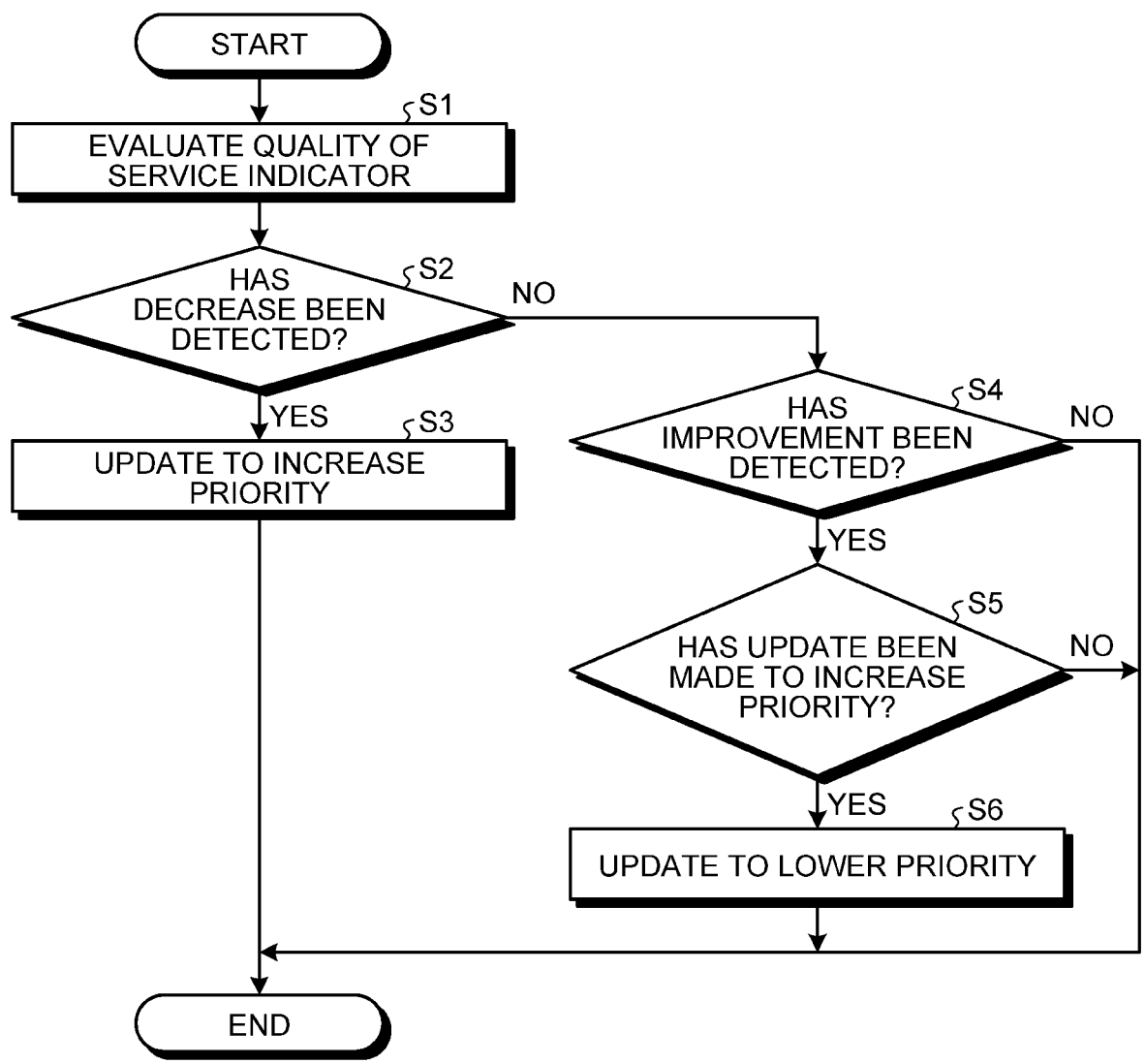
FIG. 12 is a flowchart illustrating an update operation of the conversion table at the satellite communication ground station according to the present embodiment.

FIG. 12 is a flowchart illustrating an update operation of the conversion table at the satellite communication ground station 14 according to the present embodiment. At the satellite communication ground station 14, the quality of service indicator updating unit 102 evaluates the quality of service indicator (step S1). In the above-described example, the quality of service indicator updating unit 102 compares the amount of dwell with the threshold. If a decrease in the quality of service has been detected (Yes in step S2), the quality of service indicator updating unit 102 updates the conversion table so as to increase the priority of the quality of service indicator (PCP) associated with the corresponding quality of service indicator QCI (step S3).

If a decrease in the quality of service has not been detected (No in step S2) but improvement of the quality of service has been detected (Yes in step S4), the quality of service indicator updating unit 102 determines whether or not the conversion table has been updated to increase the priority of the corresponding quality of service indicator (PCP) in the past (step S5). If the conversion table has been updated to increase the priority of the corresponding quality of service indicator (PCP) in the past (Yes in step S5), the quality of service indicator updating unit 102 updates the conversion table so as to lower the priority of the quality of service indicator (PCP) associated with the corresponding quality of service indicator QCI (step S6). If improvement of the quality of service has not been detected (No in step S4), or the conversion table has not been updated to increase the priority of the corresponding quality of service indicator (PCP) in the past (No in step S5), the quality of service indicator updating unit 102 ends the update operation. The quality of service indicator updating unit 102 repeatedly performs the above operation.

Figure 13:
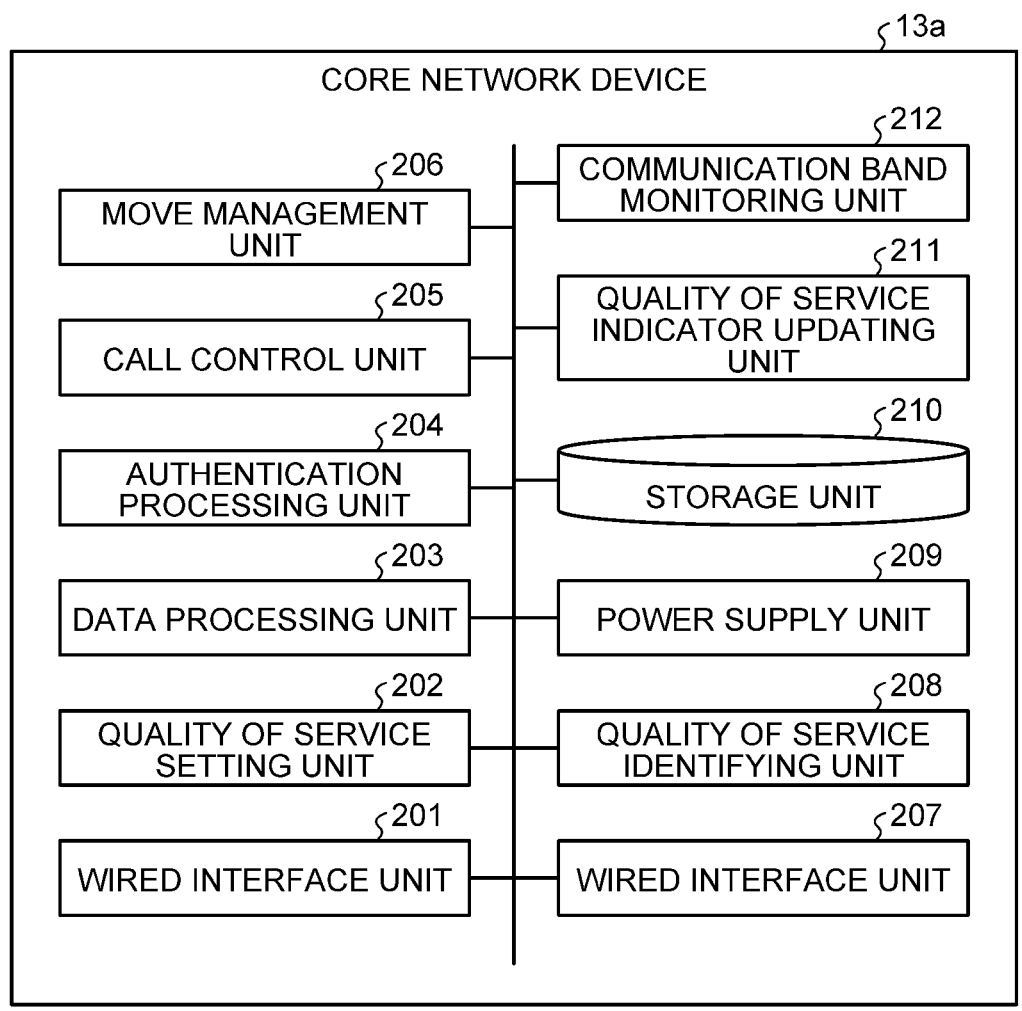
FIG. 13 is a block diagram illustrating an example of another configuration of a core network device according to the present embodiment.

Note that the present embodiment has described the case where the quality of service indicator updating unit 102 is provided in the satellite communication ground station 14, but the present disclosure is not limited thereto. In the mobile communication system 50, a quality of service indicator updating unit may be provided in the core network device 13 to evaluate the quality of service indicator. FIG. 13 is a block diagram illustrating an example of another configurations of a core network device 13a according to the present embodiment. The core network device 13a is obtained by adding a quality of service indicator updating unit 211 and a communication band monitoring unit 212 to the core network device 13 illustrated in FIG. 2. The functions of the quality of service indicator updating unit 211 and the communication band monitoring unit 212 are similar to the functions of the quality of service indicator updating unit 102 and the communication band monitoring unit 103 included in the satellite communication ground station 14. Also, as with the storage unit 107 included in the satellite communication ground station 14, the storage unit 210 stores a conversion table used in converting the quality of service indicators that have different forms in the mobile communication system 50 and the satellite backhaul link.

In the core network device 13a, the data processing unit 203 may attach priority information, which has been updated by the quality of service indicator updating unit 211, to data to be transmitted to the ground base station 10. The data processing unit 203 may attach the priority information that has been updated to an Ethernet (registered trademark) header of the data to be transmitted to the ground base station 10, or to an Internet protocol header of the data to be transmitted to the ground base station 10. In the core network device 13a, in a case where a result of evaluation indicates a decrease in the quality of service, the quality of service indicator updating unit 211 updates the conversion table so as to increase the priority of the corresponding quality of service indicator. Note that in the core network device 13a, for data corresponding to the QCI whose quality of service has been decreased, the data processing unit 203 may duplicate the data to be transmitted to the ground base station 10 and transmit the data. As a result, the mobile communication system 50 can improve the reliability of communication using the satellite backhaul link.

Next, a hardware configuration of the satellite communication ground station 14 will be described. In the satellite communication ground station 14, the wired interface unit 101 and the air interface unit 105 are communication interfaces. The power supply unit 106 is a power supply source such as a battery. The quality of service indicator updating unit 102, the communication band monitoring unit 103, the modem unit 104, and the storage unit 107 are implemented by processing circuitry. The processing circuitry may include a memory and a processor executing a program stored in the memory, or may include dedicated hardware. The processing circuitry is also called a control circuit.

Figure 14:
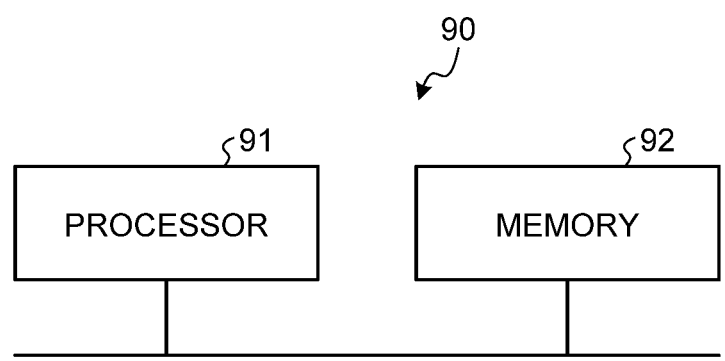
FIG. 14 is a diagram illustrating an example of a configuration of processing circuitry in a case where the processing circuitry included in the satellite communication ground station according to the present embodiment is implemented by a processor and a memory.

FIG. 14 is a diagram illustrating an example of a configuration of processing circuitry 90 in a case where the processing circuitry included in the satellite communication ground station 14 according to the present embodiment is implemented by a processor and a memory. The processing circuitry 90 illustrated in FIG. 14 is a control circuit and includes a processor 91 and a memory 92. When the processing circuitry 90 incudes the processor 91 and the memory 92, each function of the processing circuitry 90 is implemented by software, firmware, or a combination of software and firmware. The software or firmware is described as a program and stored in the memory 92. The processing circuitry 90 implements each function by the processor 91 reading and executing the program stored in the memory 92. That is, the processing circuitry 90 includes the memory 92 for storing the program that results in the execution of the processing of the satellite communication ground station 14. It can also be said that this program is a program for causing the satellite communication ground station 14 to execute each function implemented by the processing circuitry 90. This program may be provided by a storage medium storing the program, or may be provided by other means such as a communication medium.

The above program can also be said to be a program that causes the satellite communication ground station 14 to execute a first step in which the storage unit 107 stores the conversion table used in converting the quality of service indicators that have different forms in the mobile communication system 50 and the satellite backhaul link, and a second step in which the quality of service indicator updating unit 102 updates the priority of the quality of service indicator including the priority of the wireless communication of the satellite backhaul link in the conversion table on the basis of a result of evaluation of the quality of service for each quality of service indicator.

Here, the processor 91 is, for example, a central processing unit (CPU), a processing unit, an arithmetic unit, a microprocessor, a microcomputer, a digital signal processor (DSP), or the like. Moreover, the memory 92 corresponds to, for example, a non-volatile or volatile semiconductor memory such as a random access memory (RAM), a read only memory (ROM), a flash memory, an erasable programmable ROM (EPROM), or an electrically EPROM (EEPROM (registered trademark)), a magnetic disk, a flexible disk, an optical disk, a compact disc, a mini disc, a digital versatile disc (DVD), or the like.

Figure 15:
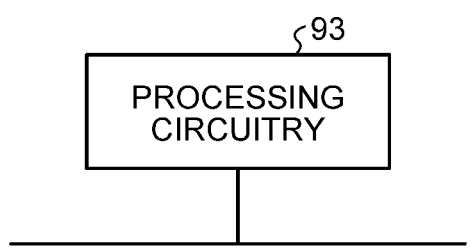
FIG. 15 is a diagram illustrating an example of processing circuitry in a case where the processing circuitry included in the satellite communication ground station according to the present embodiment includes dedicated hardware.

FIG. 15 is a diagram illustrating an example of processing circuitry 93 in a case where the processing circuitry included in the satellite communication ground station 14 according to the present embodiment includes dedicated hardware. The processing circuitry 93 illustrated in FIG. 15 corresponds to, for example, a single circuit, a complex circuit, a programmed processor, a parallel-programmed processor, an application specific integrated circuit (ASIC), a field programmable gate array (FPGA), or a combination thereof. The processing circuitry may be implemented partly by dedicated hardware and partly by software or firmware. The processing circuitry can thus implement each function described above by the dedicated hardware, software, firmware, or a combination thereof.

While the hardware configuration of the satellite communication ground station 14 has been described, the core network device 13 has a similar hardware configuration. In the core network device 13, the wired interface units 201 and 207 are communications interfaces. The power supply unit 209 is a power supply source such as a battery. The quality of service setting unit 202, the data processing unit 203, the authentication processing unit 204, the call control unit 205, the move management unit 206, the quality of service identifying unit 208, and the storage unit 210 are implemented by processing circuitry. The processing circuitry may include a memory and a processor executing a program stored in the memory, or may include dedicated hardware.

In the core network device 13a, the above program can also be said to be a program that causes the core network device 13a to execute a first step in which the storage unit 210 stores the conversion table used in converting the quality of service indicators that have different forms in the mobile communication system 50 and the satellite backhaul link, a second step in which the quality of service indicator updating unit 211 updates the priority of the quality of service indicator including the priority of the wireless communication of the satellite backhaul link in the conversion table on the basis of a result of evaluation of the quality of service for each quality of service indicator, and a third step in which the data processing unit 203 attaches information on the priority that has been updated to the data to be transmitted to the ground base station 10.

As described above, according to the present embodiment, the mobile communication system 50 using the satellite backhaul link detects the decrease in the quality of service by performing monitoring based on the evaluation of the quality of service for each quality of service indicator in the processing of converting the quality of service indicators in the satellite communication ground station 14, and updates the priority of the quality of service indicator whose quality of service has been decreased. As a result, the mobile communication system 50 in which a large number of the ground base stations 10 are placed under the same beam using the satellite backhaul link can prevent or reduce a decrease in different quality of services while preventing or reducing an influence of the quality of service indicators between the beams and between the ground base stations 10.

The satellite communication device according to the present disclosure has an effect that the quality of service indicators of different communication sections can be converted while preventing or reducing an influence of the quality of service indicators between the base stations in the mobile communication system using the satellite backhaul link.

The configuration illustrated in the above embodiment merely illustrates an example so that another known technique can be combined, the embodiments can be combined together, or the configuration can be partially omitted and/or modified without departing from the scope of the present disclosure.

What is claimed is:

1. A satellite communication device that performs communication control of a satellite backhaul link in a mobile communication system in which a ground base station and a core network device are connected via the satellite backhaul link, the satellite communication device comprising:
   a memory to store a conversion table used in converting a quality of service indicator that has a different form in each of the mobile communication system and the satellite backhaul link; and
   quality of service indicator updating circuitry to update priority of the quality of service indicator including priority of wireless communication of the satellite backhaul link in the conversion table on the basis of a result of evaluation of quality of service for each quality of service indicator, wherein
   the result of evaluation of quality of service is determined based on an amount of dwell for each quality of service indicator.

2. The satellite communication device according to claim 1, wherein
   in a case where the result of evaluation indicates a decrease in the quality of service, the quality of service indicator updating circuitry updates the conversion table so as to increase the priority of the quality of service indicator corresponding to the result of evaluation.

3. The satellite communication device according to claim 2, comprising
   modem circuitry to duplicate and transmit data to be transmitted to the ground base station.

4. A core network device in a mobile communication system in which a ground base station and the core network device are connected via a satellite backhaul link, the core network device comprising:
   a memory to store a conversion table used in converting a quality of service indicator that has a different form in each of the mobile communication system and the satellite backhaul link;
   quality of service indicator updating circuitry to update priority of the quality of service indicator including priority of wireless communication of the satellite backhaul link in the conversion table on the basis of a result of evaluation of quality of service for each quality of service indicator; and
   data processing circuitry to attach information on the priority updated to data to be transmitted to the ground base station, wherein
   the result of evaluation of quality of service is determined based on an amount of dwell for each quality of service indicator.

5. The core network device according to claim 4, wherein the data processing circuitry attaches the information on the priority updated to an Ethernet header of the data.

6. The core network device according to claim 4, wherein the data processing circuitry attaches the information on the priority updated to an Internet protocol header of the data.

7. The core network device according to claim 4, wherein in a case where the result of evaluation indicates a decrease in the quality of service, the quality of service indicator updating circuitry updates the conversion table so as to increase the priority of the quality of service indicator corresponding to the result of evaluation.

8. The core network device according to claim 5, wherein in a case where the result of evaluation indicates a decrease in the quality of service, the quality of service indicator updating circuitry updates the conversion table so as to increase the priority of the quality of service indicator corresponding to the result of evaluation.

9. The core network device according to claim 6, wherein in a case where the result of evaluation indicates a decrease in the quality of service, the quality of service indicator updating circuitry updates the conversion table so as to increase the priority of the quality of service indicator corresponding to the result of evaluation.

10. The core network device according to claim 7, wherein
    the data processing circuitry duplicates and transmits the data.

11. The core network device according to claim 8, wherein
    the data processing circuitry duplicates and transmits the data.

12. The core network device according to claim 9, wherein
    the data processing circuitry duplicates and transmits the data.

13. A control circuit to control a satellite communication device that performs communication control of a satellite backhaul link in a mobile communication system in which a ground base station and a core network device are connected via the satellite backhaul link, the control circuit causing a wireless communication device to execute:
- storing a conversion table used in converting a quality of service indicator that has a different form in each of the mobile communication system and the satellite backhaul link; and
- updating priority of the quality of service indicator including priority of wireless communication of the satellite backhaul link in the conversion table on the basis of a result of evaluation of quality of service for each quality of service indicator, wherein
- the result of evaluation of quality of service is determined based on an amount of dwell for each quality of service indicator.

14. A control circuit to control a core network device in a mobile communication system in which a ground base station and the core network device are connected via a satellite backhaul link, the control circuit causing the core network device to execute:
- storing a conversion table used in converting a quality of service indicator that has a different form in each of the mobile communication system and the satellite backhaul link;
- updating priority of the quality of service indicator including priority of wireless communication of the satellite backhaul link in the conversion table on the basis of a result of evaluation of quality of service for each quality of service indicator; and
- attaching information on the priority updated to data to be transmitted to the ground base station, wherein
- the result of evaluation of quality of service is determined based on an amount of dwell for each quality of service indicator.

15. A non-transitory storage medium storing a program to control a satellite communication device that performs communication control of a satellite backhaul link in a mobile communication system in which a ground base station and a core network device are connected via the satellite backhaul link, wherein
the program causes a wireless communication device to execute:
- storing a conversion table used in converting a quality of service indicator that has a different form in each of the mobile communication system and the satellite backhaul link; and
- updating priority of the quality of service indicator including priority of wireless communication of the satellite backhaul link in the conversion table on the basis of a result of evaluation of quality of service for each quality of service indicator, wherein
- the result of evaluation of quality of service is determined based on an amount of dwell for each quality of service indicator.

16. A non-transitory storage medium storing a program to control a core network device in a mobile communication system in which a ground base station and the core network device are connected via a satellite backhaul link, wherein
the program causes the core network device to execute:
- storing a conversion table used in converting a quality of service indicator that has a different form in each of the mobile communication system and the satellite backhaul link;
- updating priority of the quality of service indicator including priority of wireless communication of the satellite backhaul link in the conversion table on the basis of a result of evaluation of quality of service for each quality of service indicator; and
- attaching information on the priority updated to data to be transmitted to the ground base station, wherein
- the result of evaluation of quality of service is determined based on an amount of dwell for each quality of service indicator.

17. A quality of service control method in a satellite communication device that performs communication control of a satellite backhaul link in a mobile communication system in which a ground base station and a core network device are connected via the satellite backhaul link, the quality of service control method comprising:
- storing a conversion table used in converting a quality of service indicator that has a different form in each of the mobile communication system and the satellite backhaul link; and
- updating priority of the quality of service indicator including priority of wireless communication of the satellite backhaul link in the conversion table on the basis of a result of evaluation of quality of service for each quality of service indicator, wherein
- the quality of service control method further comprises determining the result of evaluation of quality of service based on an amount of dwell for each quality of service indicator.

18. A quality of service control method in a core network device in a mobile communication system in which a ground base station and the core network device are connected via a satellite backhaul link, the quality of service control method comprising:
- storing a conversion table used in converting a quality of service indicator that has a different form in each of the mobile communication system and the satellite backhaul link;
- updating priority of the quality of service indicator including priority of wireless communication of the satellite backhaul link in the conversion table on the basis of a result of evaluation of quality of service for each quality of service indicator; and
- attaching information on the priority updated to data to be transmitted to the ground base station, wherein
- the quality of service control method further comprises determining the result of evaluation of quality of service based on an amount of dwell for each quality of service indicator.

19. The satellite communication device according to claim 1, wherein
- the quality of service indicator including priority of wireless communication of the satellite backhaul link is a first quality of service indicator, and a quality of service indicator having a different form from the first quality of service indicator is a second quality of service indicator, and
- the quality of service indicator updating circuitry sets a threshold for the amount of dwell for each first quality of service indicator or each second quality of service indicator, compares the amount of dwell with the threshold to evaluate the amount of dwell, and, when the amount of dwell for a given second quality of service indicator exceeds the threshold, updates the conversion table so as to change the priority of the first quality of service indicator corresponding to the given second quality of service indicator such that the amount of dwell for the given second quality of service indicator becomes less than or equal to the threshold of the given second quality of service indicator.

\* \* \* \* \*